(12) United States Patent
McMurdie et al.

(10) Patent No.: US 7,359,626 B2
(45) Date of Patent: *Apr. 15, 2008

(54) IMAGE MASTERING API

(75) Inventors: Michael Scott McMurdie, Pleasanton, CA (US); Daniel A. Polfer, Winter Park, FL (US); Daniel L. Evers, Oviedo, FL (US)

(73) Assignee: Sonic Solutions, Inc., Santa Clara, CA (US)

( * ) Notice: Subject to any disclaimer, the term of this patent is extended or adjusted under 35 U.S.C. 154(b) by 364 days.

This patent is subject to a terminal disclaimer.

(21) Appl. No.: 11/083,647

(22) Filed: Mar. 17, 2005

(65) Prior Publication Data

US 2005/0165890 A1 Jul. 28, 2005

Related U.S. Application Data (63) Continuation of application No. 09/703,167, filed on Oct. 30, 2000, now Pat. No. 6,882,795.

(60) Provisional application No. 60/162,879, filed on Nov. 1, 1999.

(51) Int. Cl.
*H04N 5/00* (2006.01)
(52) U.S. Cl. ..................... 386/125; 386/126
(58) Field of Classification Search ............ 386/124, 386/125, 126, 105, 106, 46, 1, 45, 40, 52, 386/82
See application file for complete search history.

(56) References Cited

U.S. PATENT DOCUMENTS

| 5,200,943 | A | 4/1993 | Sano et al. |
|---|---|---|---|
| 5,592,640 | A | 1/1997 | Minoura et al. |
| 5,611,066 | A | 3/1997 | Keele et al. |
| 5,631,888 | A | 5/1997 | Itoh et al. |
| 5,638,509 | A | 6/1997 | Dunphy et al. |
| 5,831,950 | A | 11/1998 | Furukawa |
| 6,600,713 | B1 | 7/2003 | Tognazzini |
| 6,882,795 | B1 * | 4/2005 | McMurdie et al. ......... 386/125 |

FOREIGN PATENT DOCUMENTS

| EP | 0730274 | A2 | 9/1996 |
|---|---|---|---|
| GB | 2340293 | A | 2/2000 |

(Continued)

OTHER PUBLICATIONS

R. Coppola et al., "*CDs Optimal Brennen*," PC Welt, ISSN 0175-0496, Jul. 1999, pp. 180-205, Germany.

(Continued)

*Primary Examiner*—Robert Chevalier
(74) *Attorney, Agent, or Firm*—Martine Penilla & Gencarella, LLP (57) ABSTRACT

When recording data to optical media, data to be recorded is selected using a client application. An image mastering application programming interface is provided which is comprised of a collection of COM objects and integrated into the operating system. The plurality of COM objects includes a disc master, a file, a disc recorder, and a burn engine. The data selected for recording is sent through an application format interface to the file that is part of the image mastering application interface. The selected data in the file is recorded to optical media directly from Kernel Mode of the operating system.

20 Claims, 7 Drawing Sheets

FOREIGN PATENT DOCUMENTS

WO      WO-00/58958      10/2000

OTHER PUBLICATIONS

J. J. Hyon et al., "*CD it for Yourself*," Byte, McGraw-Hill, Inc., St. Peterborough, U.S., vol. 21, No. 6, Jun. 1, 1996, pp. 105-106, 108 and 111.

H. Zander, "*CD-Recording AM PC*," FKT Fernseh- Und Kino-Technik, Hutig Fachverlage, Heidelberg, Germany, vol. 51, No. 3, Mar. 1, 1997, pp. 132-141.

\* cited by examiner

IMAGE MASTERING API

CROSS REFERENCE TO RELATED APPLICATIONS

This application is a Continuation Application of U.S. patent application Ser. No. 09/703,167, filed Oct. 30, 2000, now U.S. Pat. No. 6,882,795 and entitled "IMAGE MASTERING API." This application claims priority from U.S. Provisional Patent Application No. 60/162,879, filed Nov. 1, 1999, and entitled "IMAGE MASTERING API (IMAPI)." These related applications are hereby incorporated by reference.

BACKGROUND OF THE INVENTION

1. Field of the Invention

The present invention relates generally to the recording of data onto optical media, and more particularly to the recording engine and system that transfers data from source to destination in the recording operation.

2. Description of the Related Art

Optical disc storage of data offers relatively high capacity data storage (e.g., approximately 640 Megabytes) on a relatively small and inexpensive optical disc. Optical media recording commonly involves recording (sometimes referred to as "burning") audio tracks or data files on one or more tracks on an optical disc, which can typically hold between 1 and 99 tracks. The high capacity of optical discs for data storage represents a tremendous advancement over prior art data storage such as the floppy disk which has a capacity of approximately 1.4 Megabytes. Conceivably, the trend will continue and optical discs will offer continually increasing storage capacities on similar sized or even smaller optical discs.

The process of burning, or recording data to an optical disc typically involves several data processing operations between the selection of data or audio files to be recorded and the recording of those files on an optical disc. A client application or software for the recording of data to optical media is used to accomplish the recording process. Selected data or audio files are located, examined, and sequenced in a recording order. A database of the selected data files is commonly generated. This database contains data structures necessary for identifying and locating a data file at its source, for designating the destination location, and for designating the order in which files will be recorded on the destination optical device.

Once the database has been generated, it is processed by the client application which creates memory data buffers that contain either structures describing the selected source content formatted according to one or more specified file system specifications, or data from the selected source files, and passes them to the recording engine. The recording engine takes these data buffers and, using the command set required to communicate with a specific optical recording device, issues the necessary commands and passes the appropriate data to the recording device to create the optical disc.

Figure 1:
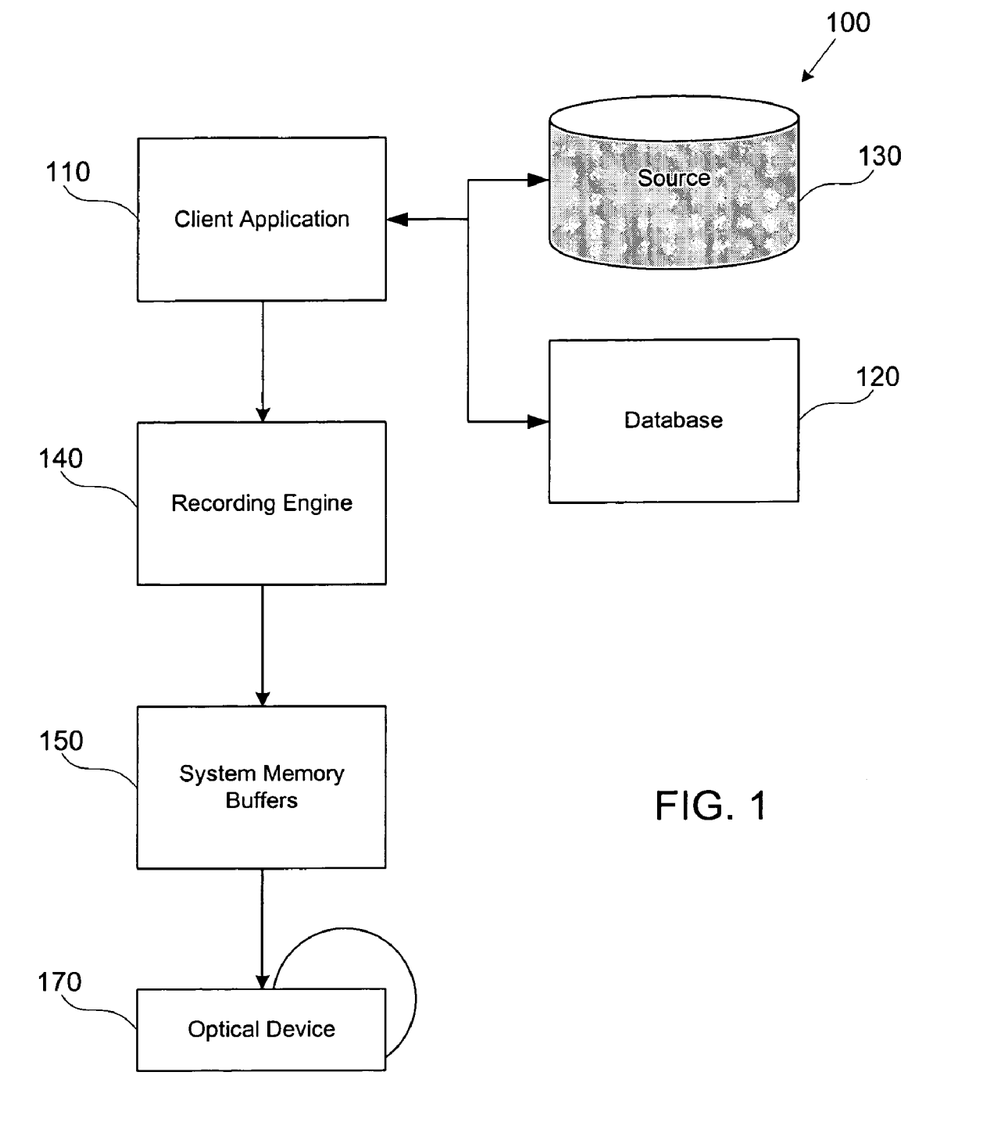
FIG. 1 shows a block diagram of a typical prior art recording process.

FIG. 1 shows a block diagram 100 of a typical prior art recording process. A client application 110 programmed to select and process data for recording to optical media initiates the recording process. The client application 110 communicates to the recording engine 140 that it wants to record data to optical media. The recording engine 140 acknowledges that it is configured to record, and the client application 110 begins assembling a file system data base 120. The client application 110 through the file system data base 120 identifies the data source 130 and designates the data structures to be created in the file system data base 120. The data identified to be recorded is sequenced in a writing order in the file system data base 120, those data files that will be cached for the recording process are identified, and the necessary data structures are created. Portions of the file system data base 120 (e.g., writing order, pointers to the data to be recorded, etc.) are passed to the CD recording engine 140 where the information is further processed in preparation for the burn operation.

When an actual or simulated burn is executed, the CD recording engine 140 reads the selected data into a buffer in system memory 150. From the buffer in system memory 150, the CD recording engine 140 directs the flow of data through optical CD recording circuitry to the destination optical device 170. As data is read out of the buffer in system memory 150 and recorded on the destination optical device 170, more data is read into the buffer 150 until all of the selected data has been read, recorded and the burn operation is complete.

The recording operation in prior art requires repeated processing of the selected data and associated data structures, and consumes significant system resources that are typically shared with all applications running in a host system. With the increasing speed of optical media recording devices, the rate of recording onto the optical disc frequently exceeds the rate at which the hard drive data source can replenish data in the buffer memory. A buffer under-run occurs when the buffer memory is unable to continuously provide data for an uninterrupted recording of the files to a given track of the optical disc. Eventually, after the buffer under-run occurs, the burning stops.

In view of the foregoing, there is a need for a method, apparatus and system for the recording of data to optical media that is more closely integrated with the host operating system. The method and system should be able to minimize the processing of data selected for recording, and then burn data to optical media in such a manner as to avoid buffer under-run and data interruption. This method and system should be configured to avoid the problems of the prior art.

SUMMARY OF THE INVENTION

Broadly speaking, the present invention fills these needs by providing an image mastering application programming interface for the recording of data to optical media. The present invention may be integrated with the operating system of a computer used for a recording operation, and accomplishes the recording process of selected data from Kernel Mode of the host computer operating system. The present invention can be implemented in numerous ways, including as a process, an apparatus, a system, a device, a method, or a computer readable media. Several embodiments of the present invention are described below.

In one embodiment, a method for recording to optical media is provided. The method includes selecting data to be recorded to optical media using a client application, and interfacing with an image mastering application programming interface. The method further includes sending the selected data through an application format interface to a file that is part of the image mastering application programming interface, and recording the selected data in the file directly from Kernel Mode of an operating system.

In another embodiment, an image mastering application programming interface for recording data to optical media is provided. The image mastering application programming interface includes a plurality of COM objects. Each of the plurality of COM objects performs an operation in the recording of data to the optical media. The image mastering application programming interface further includes an image mastering application programming interface driver. The image mastering application programming interface driver operates in Kernel Mode of a computer operating system. The operating of the image mastering application programming interface driver in Kernel Mode of the computer operating system results in the recording of data to optical media being a Kernel Mode operation.

In still a further embodiment, a computer readable media having program instructions for recording data to optical media is provided. The computer readable media includes program instructions for selecting data to be recorded to optical media using a client application, and program instructions for sending the selected data through a file in a COM object within an image mastering application programming interface. Further, the computer readable media includes program instructions for reading the selected data from the file by a burn engine of the image mastering application programming interface, and program instructions for recording the selected data directly from Kernel Mode of an operating system.

One benefit and advantage of the invention is that the image mastering application programming interface contains a stash file into which the data selected to be recorded is written in preparation for recording to optical media. By using a stash file, the image mastering application programming interface obviates the need to cache and buffer the selected data. Because the data is not buffered, there is less risk of buffer under-run. Another benefit is that the image mastering application programming interface creates a task list of the operations to be performed in recording the selected data to the optical media. The task list is created for the specific type and format of data to be recorded, and for the specific target recording device. The task list is created as a memory structure, and thus can be read by the image mastering application programming interface driver in executing a burn. Yet another benefit is the image mastering application programming interface driver which executes the burn from Kernel Mode of the operating system. The image mastering application programming interface is integrated with the host system, and when a burn is executed, the process is executed as a Kernel Mode operation. This provides for the record operation to be a system priority operation and thus not competing or sharing system resources. As a system priority operation, there is less risk of data interruption, even with very large and complex audio and video files.

Other advantages of the invention will become apparent from the following detailed description, taken in conjunction with the accompanying drawings, illustrating by way of example the principles of the invention.

BRIEF DESCRIPTION OF THE DRAWINGS

The present invention will be readily understood by the following detailed description in conjunction with the accompanying drawings, wherein like reference numerals designate like structural elements.

DETAILED DESCRIPTION OF THE PREFERRED EMBODIMENTS

An invention for recording information on optical media is disclosed. In the following description, numerous specific details are set forth in order to provide a thorough understanding of the present invention. It will be understood, however, to one skilled in the art, that the present invention may be practiced without some or all of these specific details. In other instances, well known process operations have not been described in detail in order not to unnecessarily obscure the present invention.

Figure 2:
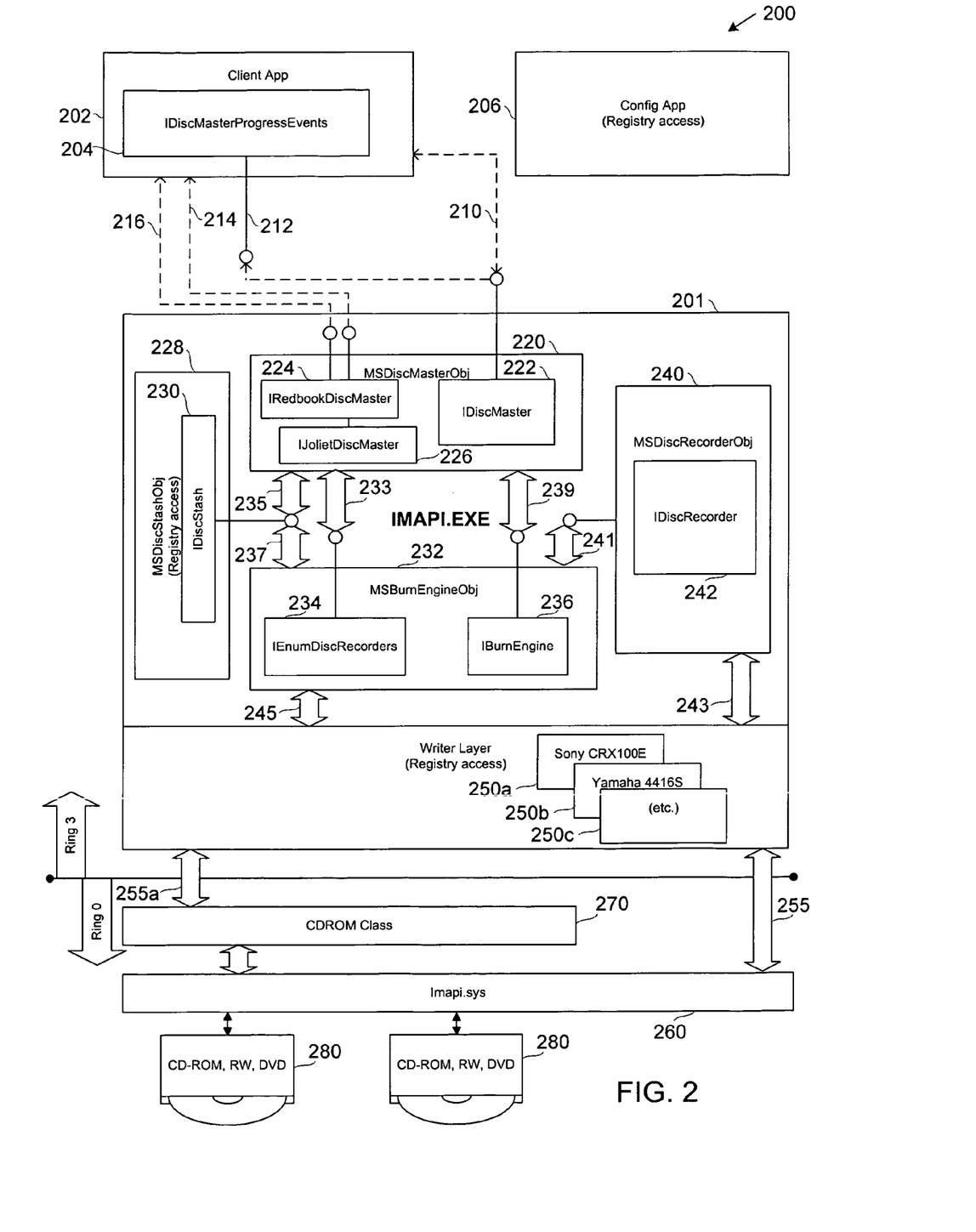
FIG. 2 shows a system diagram of the IMAPI in accordance with one embodiment of the invention.

FIG. 2 shows a system diagram 200 of the IMAPI in accordance with one embodiment of the invention. The system 200 includes the IMAPI.EXE recording engine 201, a client application 202, a configuration application 206, Imapi.sys 260, CDROM Class 270, and optical media recording devices 280.

The recording engine, IMAPI.EXE, 201 is depicted as a collection of objects and associated interfaces which read, collect, and assimilate the data selected to be burned to optical media. The recording engine 201 also manages and monitors optical device units 280 configured to the system, and sends data to a selected recording device 280 to be recorded.

The disc master 220 provides the access to the recording engine 201. Access is granted to the recording engine 201 through IDiscMaster 222, the disk master interface. Once access is obtained, a client application 202 has full access and use of all of the interfaces and methods configured to a particular system and implemented by IMAPI.EXE 201.

In addition to the disc master interface 222, other interfaces in disc master 220 include application format interfaces. By way of example, the embodiment shown in FIG. 2 contains IRedbookDiscMaster 224 and IJolietDiscMaster 226. These interfaces manipulate data to organize and create the logical and physical data structures required for optical media to be read, accessed, implemented, played, and otherwise utilized by the myriad of optical media read, record, and playback devices adhering to a particular standard. Examples of such devices include CD-ROM, CD-R/W, DVD, and the like. The IRedbookDiscMaster interface 224 adheres to the Redbook standard for audio data, and if the data desired to be recorded is audio data, then the client application 202 might use the IRedbookDiscMaster interface 224 in the recording operation. The IJolietDiscMaster interface 226 adheres to the Joliet standard for data files, and if the data desired to be recorded are data files other than audio data, then the client application 202 might use the IJolietDiscMaster interface 226 in the recording operation.

Figure 3:
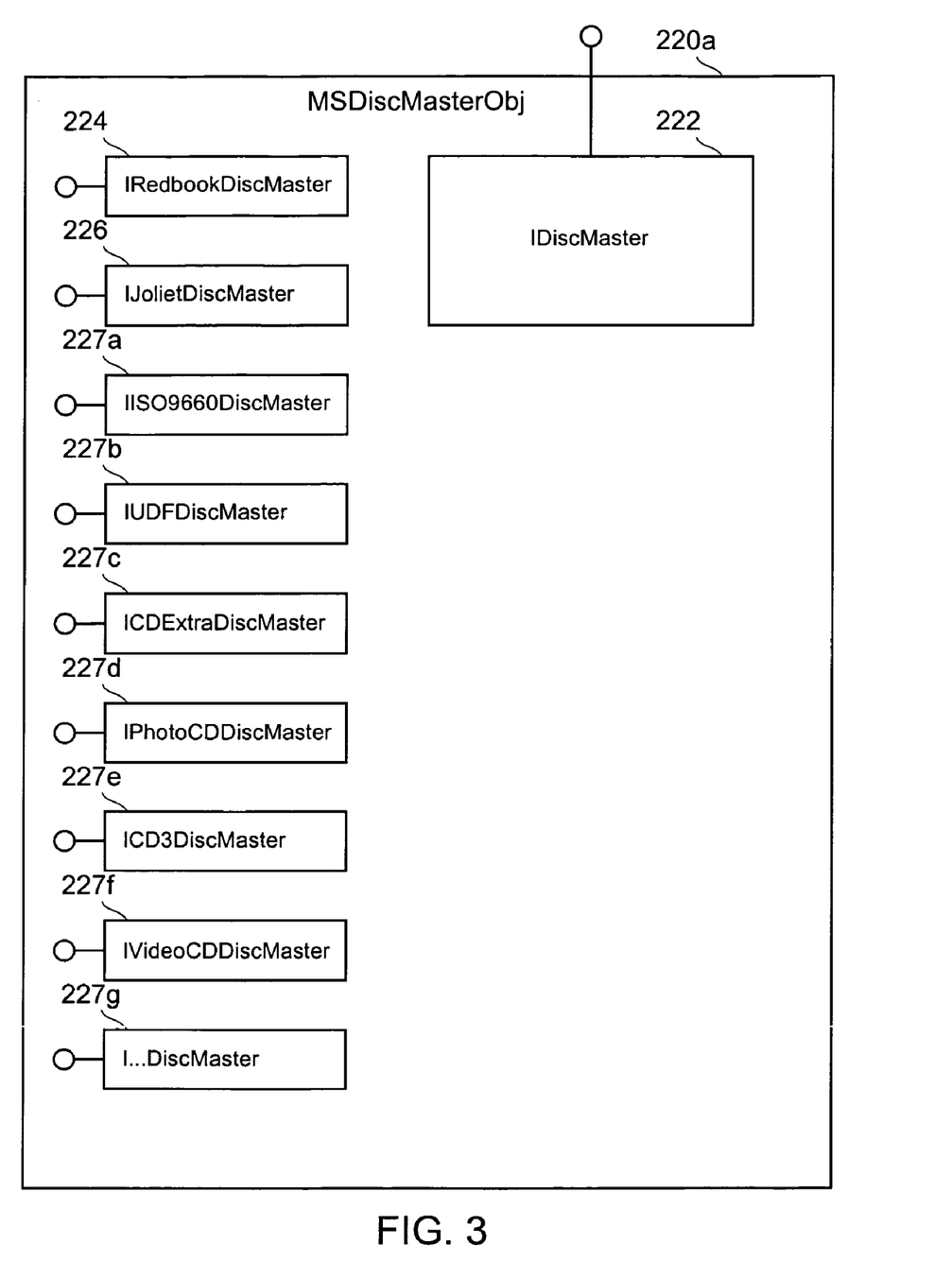
FIG. 3 shows a disc master in accordance with one embodiment of the present invention.

The disc master 220 contains all of the application format interfaces that are supported by a system. An actual recording device 280 that utilizes the supported format may or may not be connected to or present on the system, but if the system is configured to support a particular application format, there will be an application format interface for the format in the disc master 220. By way of example, FIG. 3 shows a disc master 220a in accordance with one embodiment of the present invention. In FIG. 3, the disc master 220a contains a disc master interface 222, and several application format interfaces. As stated above, for each format supported by a system, there is an application format interface in the disc master 220a. In FIG. 3, in addition to the IRedbookDiscMaster 224 and the IJolietDiscMaster 226 described above, several additional application format interfaces are configured to the exemplary system. The application format interfaces illustrated include IISO9660DiscMaster 227a for ISO9660-format data, IUDFDiscMaster 227b for UDF-format data, ICDExtraDiscMaster 227c for CD Extra-format data, IPhotoCDDiscMaster 227d for photographic data, ICD3DiscMaster 227e for audio data, IVideoCDDiscMaster 227f for video data, and I . . . DiscMaster 227g. The I . . . DiscMaster 227g interface is listed to illustrate that the embodiment represented is not all-inclusive or limiting, but representative of the many types of formats that can be supported by IMAPI 201.

Returning to FIG. 2, a client application 202 is shown connected to IMAPI 201 by a plurality of dashed lines. The dashed lines represent conceptual connections between the client application 202 and the recording engine 201, and not actual schematic connections. The client application 202 can be any application capable of creating or selecting data to be recorded to optical media. Exemplary client applications 202 include Word, Excel, Windows Explorer, Audio Recorders such as Real Jukebox, Media Player, Photo applications, Movie applications, Backup and the like. In order to obtain access to any part of the recording engine 201, the client application 202 must access the disc master interface 222. This is represented in FIG. 2 by dashed line 210 which runs from the client application 202 to an interface node of the disc master interface 222. The client application 202 calls to the disc master interface 222 to determine whether a recording engine 201 is present, what drives are provided, and what application format interfaces are present. The disc master interface 222 provides the client application 202, as represented through dashed line 210, an enumerator that enumerates the formats supported and provides identification of the application format interfaces present. In FIG. 2, the enumerator of the illustrated embodiment would enumerate Redbook and Joliet formats, and the disc master would provide the identification of IRedbookDiscMaster 224 and IJolietDiscMaster 226. The disc master interface 222 also determines whether a format is currently selected as active, and provides the active format selection to the client application 202. There is no default format. An application must select a format as active. If an active format is not already selected, the client application 202 must select a format. By way of example, if the client application 202 is to burn audio data, the client application 202 might select Redbook as the active format. Similarly, if the client application 202 is to record data files, the client application 202 might select Joliet as the active format.

Once the client application 202 has been provided enumerated formats, a format has been selected as active, and the client application 202 has been provided the application format interface identifications, the disc master interface 222 then provides the client application 202 with an enumerator that enumerates the recording devices 280 supported by the system, and presently connected to the system. The enumerator of recording devices 280 present in the system is resident in the burn engine 232, in the IEnumDiscRecorders interface 234. The IEnumDiscRecorders interface 234 provides the disc master 220 with the complete list of present and configured recording devices 280 through the connection depicted as 233. The disc master interface 222 provides the enumerated recorders to the client application 202 that are compatible with the selected format, and also informs the client application 202 which, if any, recording device 280 is currently selected as active. If there is no currently selected active recording device 280, the client application must select a recording device 280 as active.

The recording engine 201 maintains and monitors the various recording devices 280 configured to the system in the disc recorder 240. Exemplary supported recording device drivers 250a, 250b, and 250c are shown with 250c shown as a wild card to represent any configured recording device driver. The recording device drivers 250a, 250b, and 250c communicate with the disc recorder 240 as depicted by connection 243. In this manner, the disc recorder 240 maintains the parameters for each recorder that may be configured to the system. The disc recorder 240 is connected across the writer layer through the connection shown at 255 to Imapi.sys 260. As will be described in greater detail below, Imapi.sys 260 links IMAPI 201 to the actual device 280 as well as to the operating system of the host computer. This connection, among other functions, allows the disc recorder 240 to monitor the actual presence of a recording device 280. By way of example, when the operating system senses a plug-and-play recording device 280 added to or removed from the system, this status information is communicated to the disc recorder 240. The disc recorder 240 communicates the supported devices that are actually present in the system to the burn engine 232 through the IDiscRecorder interface 242, and through the connection shown at 241. Thus, the devices enumerated by the IEnumDiscRecorder interface 234, are only those supported and present in the system, and the application format interface 224, 226, narrows the field to only those that are compatible with the active format.

In one embodiment, the client application 202 must select whether or not to receive progress notification during the burn operation. That is, the client application 202, if it is so configured, can receive status updates from the disc master 220 advising of the progress of the burn operation. If the client application 202 elects to receive progress notification, the client application 202 provides a dedicated interface, the IDiscMasterProgressEvents interface 204 through which the disc master 220 provides progress notification. In FIG. 2, the notification is provided through interface node 212. In one embodiment, such notification is monitored by an operator viewing a gauge or read-out on a graphical user interface indicating the percentage of data transferred to optical media. In another embodiment, the gauge or read-out indicates the amount of data remaining to be transferred.

During the burn operation, the recording engine creates a stash file 228 that contains the data selected to be transferred to optical media as well as any logical and physical data structures required by the active format. The client application 202 directs the application format interface 224, 226 to add selected data to a stash file 228. As used herein, the stash file 228, shown as an object of IMAPI 201, is a memory structure that is populated by the application format interface 224, 226 with data as selected by the client application 202, and with the active format required logical and physical data structures. In one embodiment, the stash file 228 is an 800 MB file and is accessed by the application format interface 224, 226 through the IDiscStash interface 230. The application format interface 224, 226 populates the stash file 228 through an interface node on the IDiscStash interface 230 through connection 235.

Once the stash file 228 has been fully populated, the recording engine 201 creates a task list to describe the contents of the stash file 228, and identify the specific layout of the stash file 228. The burn engine 232 then examines the task list to determine the specific tasks for the exact recording device 280 to which the stashed data will be written.

When an actual or simulated burn is executed, the burn engine 232 retrieves the data from the stash file 228 in accordance with the task list and passes the data to Imapi.sys 260. The burn engine 232 accesses the stash file 228 through connection 237 into the interface node of the IDiscStash interface 230. As illustrated in FIG. 2, the burn engine 232 is connected to the writer layer through connector 245, and the writer layer to Imapi.sys 260 across the User Mode/ Kernel Mode boundary (shown in FIG. 2 as Ring3/Ring0 boundary) through connectors 255 and 255a. Imapi.sys 260 is broadly defined as an image mastering application programming interface driver. Imapi.sys 260 both contains the drivers for the various COM objects described above, and integrates the IMAPI 201 with the host operating system.

In the illustrated embodiment, Imapi.sys 260 is a Kernel Mode operation. Thus, Imapi.sys 260 as a Kernel Mode operation, reads the data directly from the stash file and passes it to the active recording device 280. The CDROM Class 270 is a system interface to the general class of compact disc devices, which includes most optical disc media, and provides general device parameters to IMAPI as well as basic read functionality. During an actual or simulated burn operation, the data is not buffered or cached through system memory, and the burn operation is not shared or competing with other applications. Additionally, the CDROM Class 270 is blocked from sending commands to the recording device 280. The burn operation is performed as a system priority operation. Fatal data interruption and buffer under-run are therefore avoided, resulting in efficient and precision data recording to optical media.

The remaining structure in the system diagram 200 illustrated in FIG. 2 is the configuration application 206. The configuration application 206 configures the host system for the specific operations of IMAPI 201. By way of example, the configuration application 206, configures the host system for the recording devices 280 supported by IMAPI 201, and then configures the host system to access IMAPI 201 when a client application 202 launches a record operation. Thus, the configuration application 206 serves to integrate IMAPI 201 and its associated functions into the host system operations.

Figure 4:
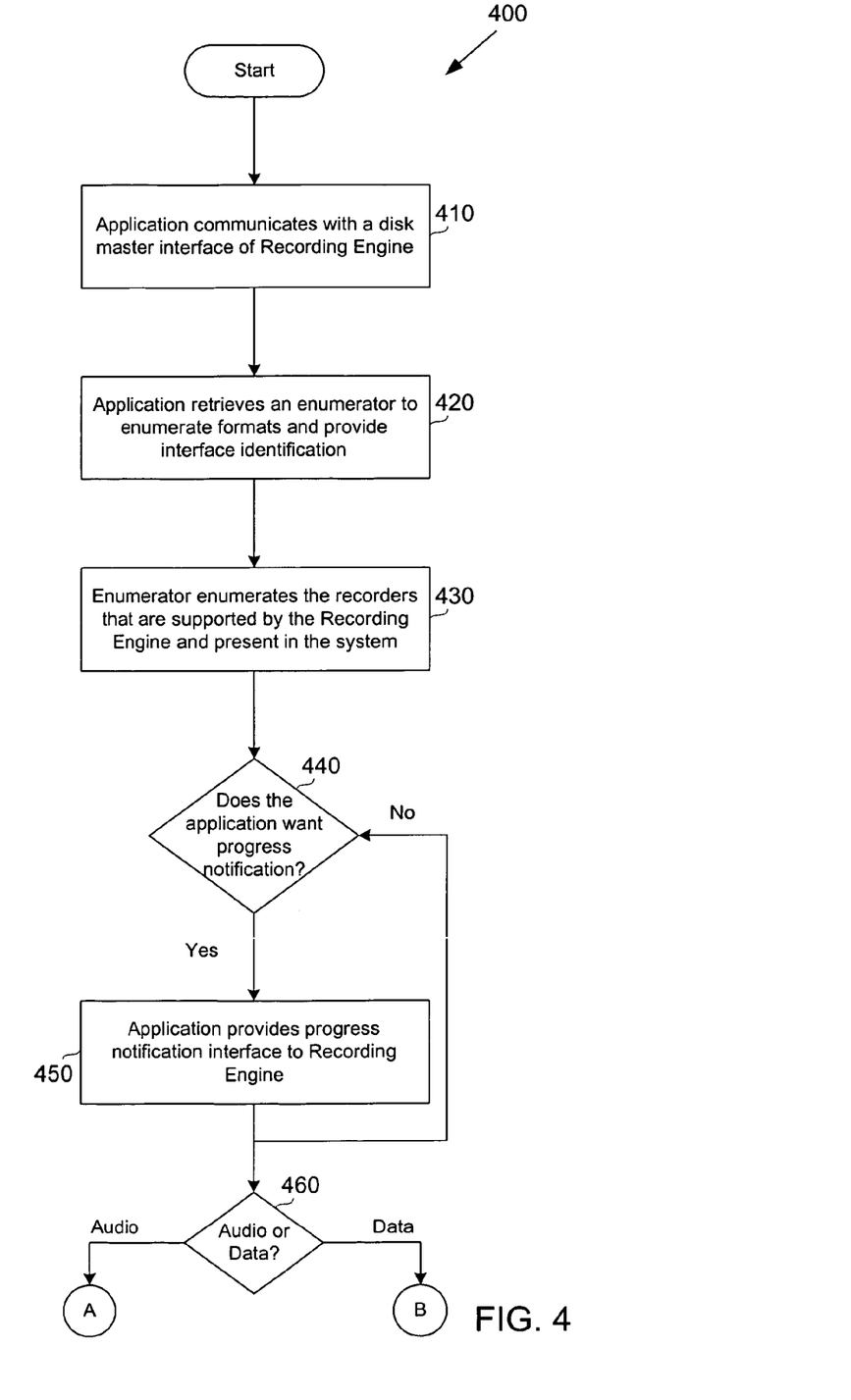
FIG. 4 shows a flowchart diagram illustrating the method operations performed in which data is recorded to optical media in accordance with one embodiment of the invention.

FIG. 4 shows a flowchart diagram 400 illustrating the method operations performed in which data is recorded to optical media in accordance with one embodiment of the invention. The method begins with operation 410 in which a client application communicates with a disc master interface of a recording engine. The recording engine provides the interface as described above for the client application to call into the recording engine. In this initial communication 410, the client application acquires access to the recording engine, IMAPI, through the disk master interface. Once access is acquired, the application has full access to all of the interfaces and methods implemented in a particular system.

In operation 420, the application retrieves an enumerator to enumerate formats and provide interface identification to the application. In one embodiment, the formats include Redbook audio format and Joliet data format. In other embodiments, the formats include Redbook audio format, Joliet data format, ISO 9660 data format, UDF data format, CD Extra audio and data formats, Video CD video data format, Photo CD photo data format, CD3 audio format, and the like, in any combination of supported formats as determined by a particular system configuration.

In operation 420, the application retrieves the disc master format enumerator to examine the set of formats the system supports, and then to select a format to be the active format. By way of example, the enumerator enumerates Redbook audio and Joliet data formats as formats supported by the system. The application, e.g., Word, chooses Joliet data to be the active format to burn a Word document to CD. In one embodiment, the enumerator enumerates the formats supported by the system, and then calls to the disk master to identify the currently active format, if there is one selected. As described above, there is no default format. In this embodiment, the application selects a new active format in those situations when the active format is other than the format required by the client application, or when there is no active format identified by the disc master. If the currently active format is the same as the format the application requires, the format is accepted and the method proceeds to the next operation.

In operation 430, the enumerator enumerates a list of all the recording devices that are supported by the recording engine, that utilize the active format selected or accepted in operation 420, and that are present in the system. If there is no currently selected active recorder, the application must select an active recording device. Once the list of all supported recording devices is enumerated, the application either selects a recording device as active, or accepts a currently active recording device.

In one embodiment of both operations 420 and 430, there is no default format or recording device. Upon initial call to open the disk master to write data to an optical disc media, the application must select first a format (operation 420) from the enumerated list of supported formats, and then select a recording device (operation 430) from the enumerated list of recording devices that utilize the selected format.

The method advances to decision block 440 where, in one embodiment, the disc master requires the application to elect whether or not to receive progress notification. Progress notification can include, for example, notification to the application of the percentage of data recorded in a burn operation, the percentage of data remaining to be burned, the amount of time remaining in the burn operation, or other such operation progress information. If the application elects progress notification, a "yes" to decision block 440, then the method advances to operation 450 and the application provides a progress notification interface to the recording engine. In one embodiment, the progress notification interface is a specific interface node through which the recording engine provides periodic progress information to the application.

If the application does not support or does not elect to receive progress notification, a "no" at decision block 440, the method bypasses operation 450 and no progress interface is provided. The method then proceeds to decision block 460 where it splits into two sets of method operations defined by whether the data to be recorded is audio or data files. For audio data, the method proceeds to connector A, and for data files, the method proceeds to connector B.

Figure 5:
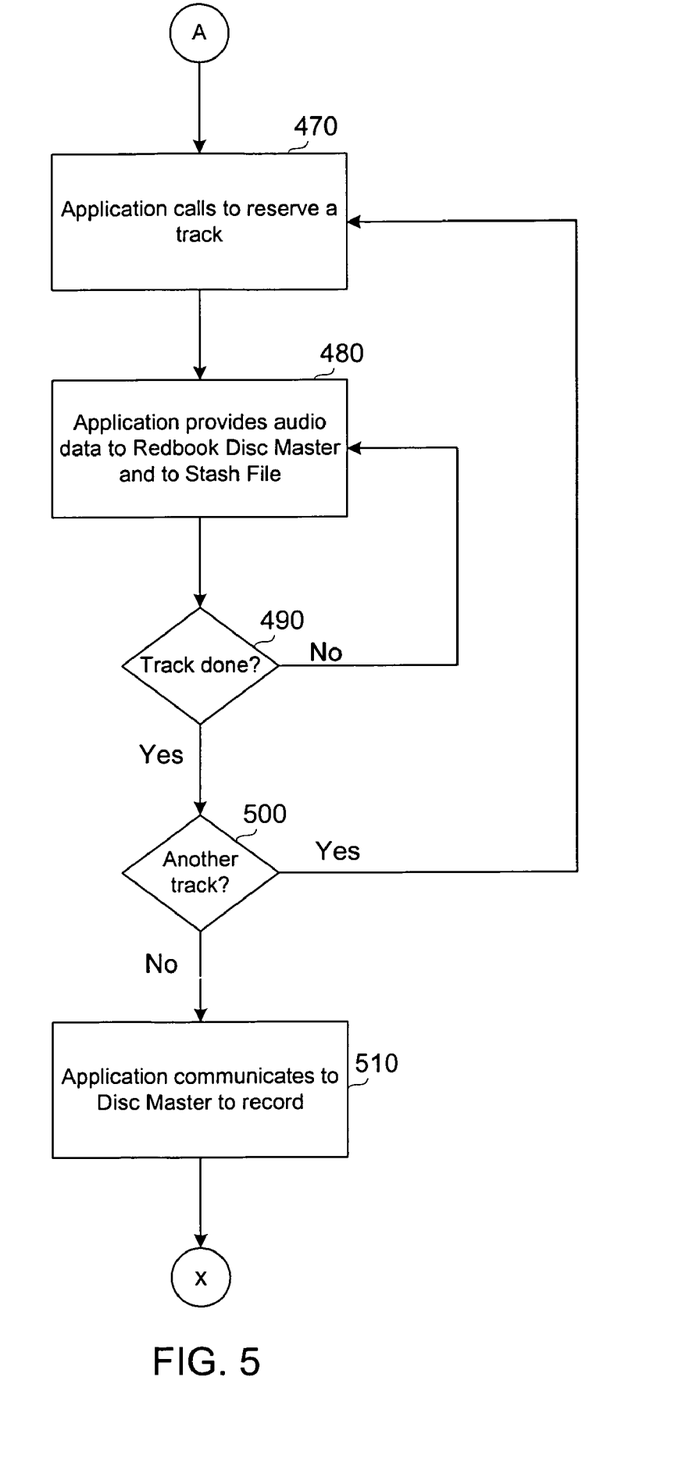
FIG. 5 shows the continuation of the flowchart diagram showing the method operations performed in which data is recorded on an optical disc in accordance with one embodiment of the invention.

FIG. 5 shows the continuation of flowchart diagram 400 showing the method operations performed in which data is recorded on an optical disc in accordance with one embodiment of the invention. In FIG. 5, the method illustrated is for the recording of audio data. The method continues with operation 470 in which the application calls to reserve a track for audio data recording. In one embodiment, the system utilizes a Track-at-Once mode for recording in which audio gaps are of a fixed size. The method allows for the creation of multi-track audio discs with one track at a time open for recording. In operation 470, the application calls to the application format disc master (e.g., IRedbookDiscMaster) to reserve an audio track. This call initiates the processes by which the application format disc master will analyze the optical media to which the audio data will be recorded to evaluate how many tracks are recorded on the selected media, how many audio blocks are available for recording, and the size of an audio block. In one embodiment, the size of an audio block is hard coded at 2352 bytes.

The method then proceeds to operation 480 where the client application provides the audio data to the application format disc master and instructs the application format disc master to read the audio data into a stash file. By way of example, a client application selects a play list of audio data stored on a remote server. The application format disc master then reads the audio data as directed by the client application into a stash file.

In the embodiment illustrated in FIG. 5, the method continually monitors the size of the audio track. In one embodiment, the size of an audio track is a fixed or maximum number of sectors. In decision block 490, the application format disc master determines whether a track is done, and as long as space remains, the application continues to provide audio data to the application format disc master which reads the audio data into the stash file. Depending on the format used, the available size of a track includes the sectors required for format structures, gaps, and the like. Once the application format disc master determines a track is full, the method advances to decision block 500 and determines whether more audio data remains to be recorded, e.g., if another track is needed. If so, the method returns to operation 470 for the application to call to reserve another track. The method then repeats the operations described above until no additional tracks are required.

Once the client application has provided all of the selected audio data to be read by the application format disc master into a stash file and no additional tracks are required, the method proceeds to operation 510 where the application calls to the disc master to record the audio data. The method then proceeds to connector "x" for the recording of audio data which is illustrated in FIG. 6.

Figure 6:
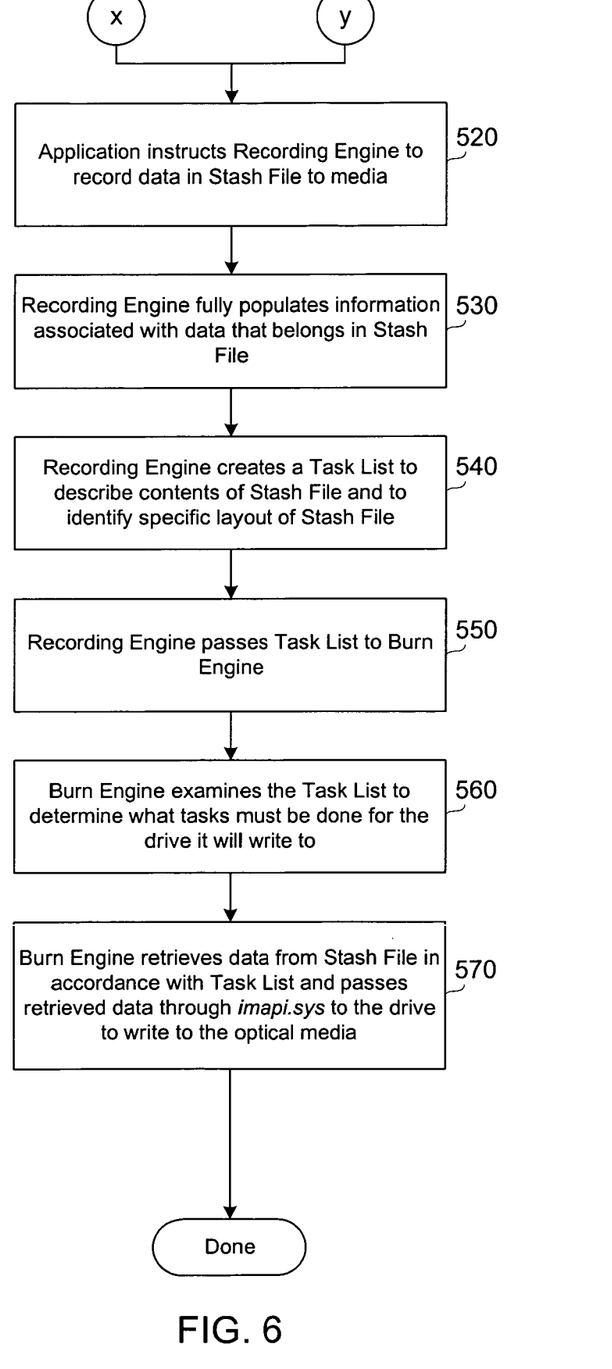
FIG. 6 illustrates the further continuation of the flowchart diagram showing the method operations performed in which data is recorded on an optical disc in accordance with one embodiment of the invention.

FIG. 6 illustrates the continuation of flowchart diagram 400 showing the method operations performed in which data is recorded on an optical disc in accordance with one embodiment of the invention. Connector "x" represents the continuation of the flow of the method operations for the recording of audio data. In operation 520, the client application instructs IMAPI, the recording engine, to record the data in the stash file to media. At this point, IMAPI takes control of the record operation.

In operation 530, the recording engine fully populates the stash file with information associated with the audio data to be recorded. The information is specific to the format to be used in recording the audio data.

The method then advances to operation 540 where the recording engine creates a task list to describe the contents of the stash file. The task list identifies the specific layout of the stash file to include the location of different sectors, files, tracks, file system, and the like. In creating the task list, the recording engine maps out the logical and physical structure of the media to which the data will be recorded. With the logical format selected in an earlier operation, and with the recording device already selected as well, the recording engine builds a task list to be executed by the burn engine when performing a simulated or actual burn of the audio data to the target media.

Once the task list is created, the method advances to operation 550 and passes the task list to the burn engine. In one embodiment, the task list is created as a memory structure and the passing of the task list by the recording engine to the burn engine is a call to the burn engine to read the task list memory structure from memory. It is the burn engine that will execute the task list and accomplish the recording of the audio data to the target media.

It should be noted at this point that in one embodiment of the present invention, the driver for the burn engine that executes the simulated or actual burn of data to the recording device is located in the imapi.sys structure (see FIG. 2) and operates in Kernel Mode. The burn engine and imapi.sys are discussed in greater detail below.

The method then proceeds to operation 560 and the burn engine examines the task list. The burn engine determines the tasks that must be done, and any data manipulation that must be accomplished for the specific drive and device to which it will write.

The method concludes with operation 570. In executing a burn, the burn engine retrieves the audio data in the stash file in accordance with the task list. The audio data is passed through imapi.sys to the selected drive to write to the optical media. During an actual or simulated burn operation, the burn engine is controlled by the driver in imapi.sys executing the operation in Kernel Mode. As described above in reference to FIG. 2, imapi.sys is generally a set of drivers for the various objects of IMAPI, and serves to integrate IMAPI with the host operating system. In one embodiment, imapi.sys is coded specifically for each operating system in which it executes. By way of example, there is an imapi.sys for a Windows95/98 operating system, one for a Windows NT operating system, and so forth for any particular operating system in which it executes. As discussed in greater detail above, a feature of the present invention is that it executes the task list and reads the stashed audio data from the stash file and burns it to the selected recording device in Kernel Mode. The audio data, therefore, is not cached and buffered in system memory during a simulated or actual burn, and therefore buffer under-run is avoided. Further, as a Kernel Mode process, the operations of imapi.sys in executing a task list and reading the audio data from the completely imaged stash file are system priority operations. Thus, the typical processor-sharing with other applications, and other such risks of fatal audio data interruption are also avoided.

The method operations for recording data files to the selected device are similar to those of recording audio data. As discussed in reference to FIG. 4, the method operations for data recording split at decision block 460. If the data to be recorded is data other than audio data, the method proceeds to connector B, and continues with the operations illustrated in FIG. 7.

Figure 7:
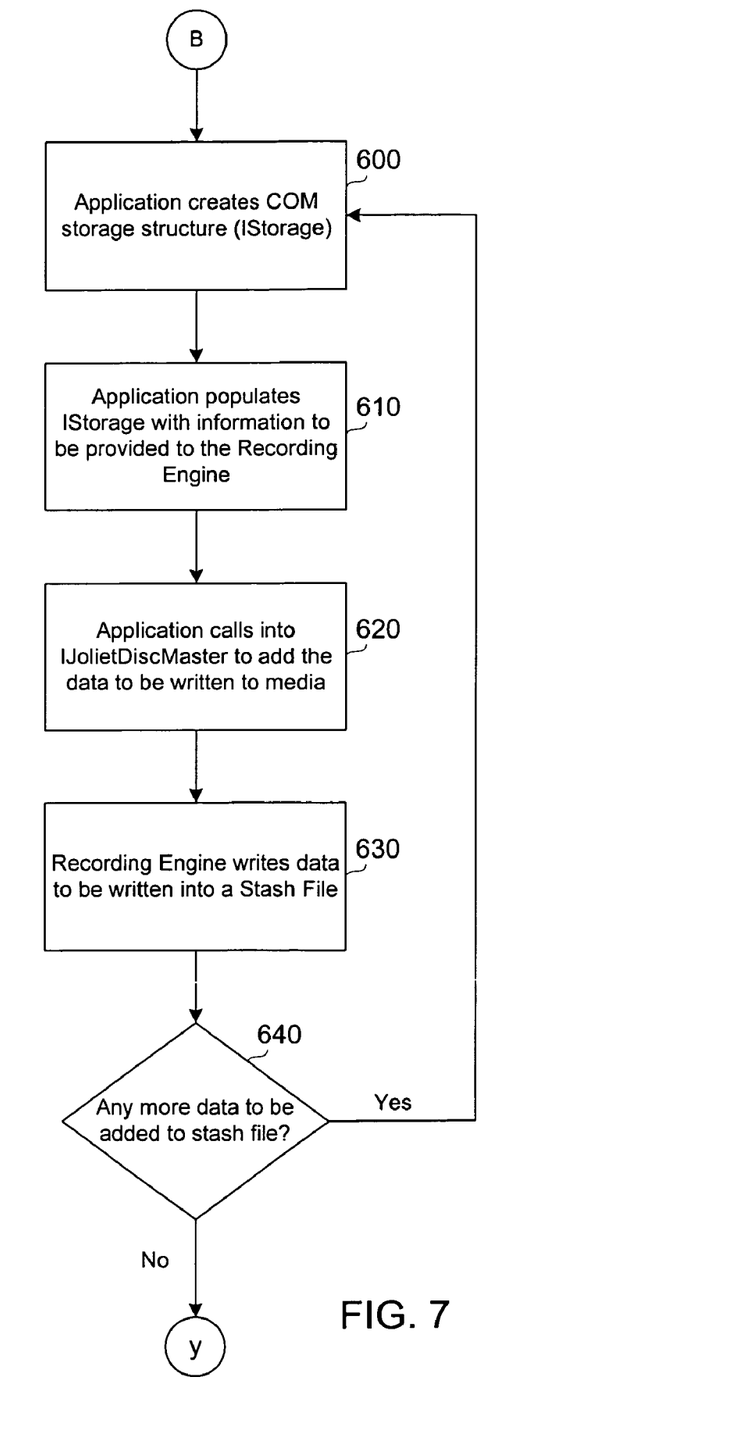
FIG. 7 illustrates a further continuation of flowchart diagram showing the method operations performed in which data is recorded on an optical disc in accordance with one embodiment of the invention.

FIG. 7 illustrates the continuation of flowchart diagram 400 showing the method operations performed in which data is recorded on an optical disc in accordance with one embodiment of the invention. Connector B represents the continuation of the flow of the method operations for the recording of data other than audio data. The method continues with operation 600 in which the client application (e.g., Word, Excel, Access, etc.) creates a COM storage structure called IStorage. IStorage is a data structure for COM applications that serves as a vehicle for data files with IMAPI. IStorage has an internal structure containing both files and folders and associated names and attributes, and is used for data files applications with IMAPI.

Once the client application has populated IStorage with all of the data to be written to optical media, the method advances to operation 620. In operation 620, the client application calls to the application interface disc master (e.g., IJolietDiscMaster) to add the stored data to the stash file. Following the call to add data to the stash file, the method advances to operation 630 and the recording engine then reads the data from IStorage into the stash file. In one embodiment, this operation is called adding structures to the image. The application format disc master, e.g., IJolietDiscMaster, manipulates the data to add to the image or stash file.

Next, the method evaluates decision block 640. At decision block 640, the method checks to see if there is more data to be added to the stash file. If there is more data to be added to stash, the method loops back to operation 600 where the client application creates a COM storage structure for the data to be added, and then proceeds with the method operations as described above. If there is no more data to be added to the stash file, the method advances to connector "y," which is the continuation of the method operations illustrated in FIG. 6.

FIG. 6 illustrates the continuation of flowchart diagram 400 showing the method operations performed in which data is recorded on an optical disc in accordance with one embodiment of the invention. Connector "y" represents the continuation of the flow of the method operations for the recording of data other than audio data. It should be noted that the method operations from this point forward are identical to those operations performed in the recording of audio data, and have been fully described above. The method continues with operation 520 in which the client application calls to the recording engine to record the data located in the stash file to the selected recording device.

The method then advances to operation 530 and the recording engine fully populates the stash file with information associated with the data in the stash file. The information is determined by the active format, and can include such structures as volume descriptors and file systems. By way of example, IJolietDiscMaster populates a stash with primary volume descriptors, supplementary volume descriptors, volume descriptor set terminators, path tables, directory records, and the like. Such structures and other information are those elements associated with the particular format selected in which to write the data to the recording device.

Next, the method performs operation 540 in which the recording engine creates a task list as described above in reference to the recording of audio data. In operation 550 the recording engine passes the task list to the burn engine, and the burn engine examines the task list in operation 560. In operation 570, the burn engine retrieves the data from the stash file in accordance with the task list, and passes the data through imapi.sys to the selected recording device and the method is done. As described in detail above, the reading of the data from the stash file in operation 570 is accomplished in Kernel Mode, and thereby avoids the risks of buffer under-run and data interruption.

The invention may employ various computer-implemented operations involving data stored in computer systems. These operations are those requiring physical manipulation of physical quantities. Usually, though not necessarily, these quantities take the form of electrical or magnetic signals capable of being stored, transferred, combined, compared, and otherwise manipulated. Further, the manipulations performed are often referred to in terms, such as producing, identifying, determining, or comparing.

Any of the operations described herein that form part of the invention are useful machine operations. The invention also relates to a device or an apparatus for performing these operations. The apparatus may be specially constructed for the required purposes, or it may be a general purpose computer selectively activated or configured by a computer program stored in the computer. In particular, various general purpose machines may be used with computer programs written in accordance with the teachings herein, or it may be more convenient to construct a more specialized apparatus to perform the required operations.

The invention can also be embodied as computer readable code on a computer readable medium. The computer readable medium is any data storage device that can store data, which can thereafter be read by a computer system. Examples of the computer readable medium include read-only memory, random-access memory, CD-ROMs, CD-Rs, CD-RWs, magnetic tapes, and other optical data storage devices. The computer readable medium can also be distributed over network coupled computer systems so that the computer readable code is stored and executed in a distributed fashion.

Although the foregoing invention has been described in some detail for purposes of clarity of understanding, it will be apparent that certain changes and modifications may be practiced within the scope of the appended claims. Accordingly, the present embodiments are to be considered as illustrative and not restrictive, and the invention is not to be limited to the details given herein, but may be modified within the scope and equivalents of the appended claims.

What is claimed is:

1. A method for recording to optical media, comprising:
    selecting data to be recorded to optical media using a client application;
    interfacing with an image mastering application programming interface (IMAPI);
    sending the selected data through an application format interface to a file that is part of the IMAPI; and
    recording the selected data in the file directly from Kernel Mode of an operating system.

2. The method for recording to optical media of claim 1, wherein IMAPI is a collection of COM objects, and further wherein IMAPI is integrated into the operating system.

3. The method for recording to optical media of claim 1, further comprising:
    selecting one of a plurality of optical media formats supported by the IMAPI;
    selecting one of a plurality of optical media recording devices supported by IMAPI; and
    sending the selected data through the application format interface to the file that is part of the IMAPI, wherein the application format interface is associated with the selected one of the plurality of media formats.

4. The method for recording to optical media of claim 1, further comprising:
    creating a task list of operations to perform in recording the selected data to the optical media device, the selected data in the file being recorded directly from Kernel Mode of the operating system by executing the task list.

5. The method for recording to optical media of claim 3, wherein the plurality of supported media formats include one or more of Redbook, Joliet, ISO 9660, UDF, HFS, VideoCD, PhotoCD, CDExtra, Mixed Mode, Raw Mode, Cue Sheet, unformatted, and CD3.

6. The method for recording to optical media of claim 1, wherein the file that is part of the IMAPI is a stash file, the stash file being created in a COM object within IMAPI.

7. The method for recording to optical media of claim 6, wherein IMAPI populates the stash file with data structures in accordance with a selected media format.

8. The method for recording to optical media of claim 4, wherein IMAPI creates the task list for a burn engine to execute to record the selected data to optical media, the burn engine being a COM object in IMAPI and controlled by a driver from within Kernel Mode of the operating system.

9. An image mastering application programming interface for recording data to optical media, comprising:
   a plurality of COM objects wherein each of the plurality of COM objects performs an operation in the recording of data to the optical media, and
   an image mastering application programming interface driver, the image mastering application programming interface driver operating in Kernel Mode of a computer operating system,
   wherein the operating of the image mastering application programming interface driver in Kernel Mode of the computer operating system results in the recording of data to optical media being a Kernel Mode operation.

10. The image mastering application programming interface of claim 9, wherein the plurality of COM objects includes a disc master, a file, a disc recorder, and a burn engine.

11. The image mastering application programming interface of claim 10, wherein the disk master provides access for a client application to all operations and functions of the image mastering application programming interface.

12. The image mastering application programming interface of claim 10, wherein the file is a stash file, the stash file being a file into which is written data selected by a client application to be recorded to optical media.

13. The image mastering application programming interface of claim 10, wherein the disc recorder provides status and configuration information of optical media recording devices to which data is recorded.

14. The image mastering application programming interface of claim 10, further comprising a task list created by the image mastering application programming interface, wherein the task list includes a list of tasks to be accomplished in the recording of data to optical media.

15. The image mastering application programming interface, of claim 14, wherein the burn engine reads data from the file and sends the data to be recorded by an optical media recording device in accordance with the task list.

16. A computer readable media having program instructions for recording data to optical media, comprising:
   program instructions for selecting data to be recorded to optical media using a client application;
   program instructions for sending the selected data through a file in a COM object within an image mastering application programming interface;
   program instructions for reading the selected data from the file by a burn engine of the image mastering application programming interface; and
   program instructions for recording the selected data directly from Kernel Mode of an operating system.

17. The computer readable media of claim 16, further comprising:
   program instructions for populating the file containing the selected data to be recorded to optical media with optical media data structures; and
   program instructions for creating a task list of operations to perform in recording the selected data to a compact disc recording device,
   wherein the populating is in accordance with a selected media format compatible with the compact disc recording device.

18. The computer readable media of claim 16, wherein the image mastering application programming interface is integrated into the operating system.

19. The computer readable media of claim 16, wherein the image mastering application programming interface is controlled by drivers from within Kernel Mode of the operating system.

20. The computer readable media of claim 16, wherein the image mastering application programming interface is a collection of COM objects integrated into the operating system.

* * * * *